May 14, 1935.  F. A. THOMANN  2,001,077
HARVESTER
Original Filed Feb. 24, 1930
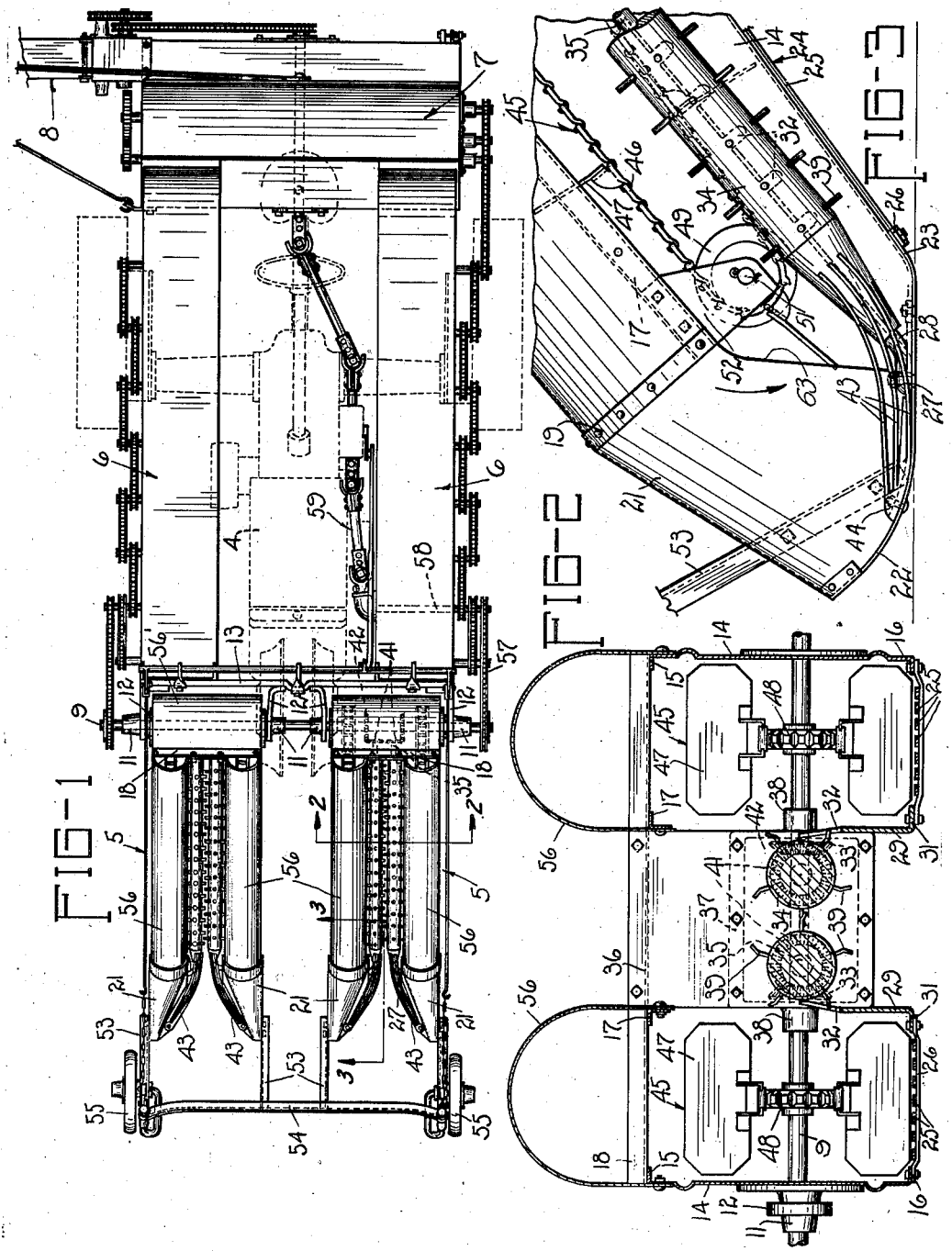
INVENTOR
Frederick A. Thomann
BY Brown, Jackson, Boettcher & Dienner
ATTORNEY
WITNESS
Walter Ackerman Patented May 14, 1935

2,001,077

UNITED STATES PATENT OFFICE 2,001,077

HARVESTER

Frederick A. Thomann, East Moline, Ill., assignor to Deere & Company, Moline, Ill., a corporation of Illinois Application February 24, 1930, Serial No. 430,731
Renewed August 6, 1934

28 Claims. (Cl. 56—33)

This invention relates to harvesters, and more particularly to stripping and conveying mechanism for cotton harvesters. Certain features of my invention are especially useful in cotton harvesters adapted to be mounted on a tractor and to be operated thereby by suitable power take-off connections therefrom, and a cotton harvester of this general type embodying my present improvements is disclosed in the application of Frank T. Court, Serial No. 439,888, filed March 29, 1930.

In the above noted copending application, my improvements are disclosed as applied to a cotton harvester of the two-row type comprising generally two sets of stripping rolls mounted forwardly of the tractor which are adapted to strip the cotton bolls from the plant stalks as the plants of two adjacent rows are guided between the stripping rolls of the respective stripping mechanisms.

In order to better illustrate the principles of the present invention, I have shown the same as embodied in a cotton harvester in which the cotton bolls removed from the plants by the stripping mechanisms are carried by elevators into preliminary cleaners which are mounted one on each side of the tractor and which are adapted to convey the stripped matter rearwardly and to simultaneously separate from the cotton any such foreign matter as bolls, stalks, and twigs which may be stripped from the cotton plants along with the cotton. The combined cotton conveying and cleaning mechanisms are each adapted to discharge the preliminarily cleaned cotton into final cleaning apparatus whence the cotton is adapted to be discharged into receptacles mounted rearwardly of such apparatus at the rear end of the tractor.

The present invention is directed particularly to the stripping rolls, to the elevators or conveying means employed in conjunction with the stripping mechanisms, and to the novel arrangement of the elevators or conveyors relative to the stripping rolls. In general, each stripping mechanism comprises two component or cooperating parts forwardly and downwardly inclined, each provided with a stripping roll having outwardly projecting fingers extending from the periphery thereof. The rolls are so arranged that the fingers of the respective rolls are adapted to pass each other in overlapping and staggered relation. In operation, the rolls are adapted to rotate in a direction upwardly relative to the plants so that the cotton is stripped upwardly and is carried over the tops of the rolls. Adjacent to the peripheries and slightly spaced therefrom, on the outer sides of the rolls, are mounted stripping plates having notches therein for the passage of the fingers of the stripping rolls therethrough, such plates extending along the entire lengths of the stripping rolls. The fingers of each stripping roll preferably extend outwardly and substantially radially of the periphery of each roll for a short distance and the ends thereof are each bent in a direction opposite to the direction of rotation of the rolls. The notched stripping edges of the stripping plates are each inclined toward the peripheries of the stripping rolls. By reason of the bend provided in the fingers, as the fingers move down through the notches in the stripping plates and withdraw from such notches, the end portions of the fingers recede from the notches on an efficient stripping angle, approximating a right angle, so that the cotton is easily pulled or stripped from the fingers without any tendency to bunch or clog between the under sides of the fingers and the stripping plate, which might otherwise cause some of the cotton to be drawn through the notches and lost. The angle of the upper notched edge of the plate relative to the stripping roll aids in this improved stripping action. As the matter retained by the stripping rolls is combed therefrom by the stripping plates, it is deposited upon gratings or screens comprising the bottoms of conveyor mechanisms disposed alongside the stripping rolls, the screens being preferably formed of longitudinally disposed slats, where it is picked up by paddles or flight bars of endless, longitudinally disposed elevators and carried upwardly along the screens to the upper discharge end of each stripping mechanism. The conveyors are so arranged that the lower ends thereof are disposed beyond the ends of the stripping rolls so that cotton picked up by gathering fingers disposed adjacent the tips of the stripping rolls or by the extreme tips of the rolls is carried up. The elevators or conveyors are each enclosed by an improved arrangement of shields provided at the top of each component part of the stripping mechanisms, so that none of the cotton being conveyed to the cleaning apparatus will be lost.

With the above in view, it is the main object of this invention to provide a novel stripping and conveying mechanism for a cotton harvester of the character disclosed.

Another object is the provision of stripping plates for combing matter from the stripping rolls after such matter has been picked or stripped from cotton plants.

A further object is to provide inclined portions on the stripping plates which are adapted to comb matter from the stripping rolls in a direct and positive manner.

Another object is to provide backwardly inclined fingers on the stripping rolls so that matter stripped from the plants and carried thereby will be positively and directly withdrawn therefrom by the inclined portions of the stripping plates.

A further object is the provision of elevators or conveyors which are adapted to convey matter stripped or combed from the stripping rolls upwardly and rearwardly and to be discharged thereby at the rear ends of the stripping mechanism.

Another object is the provision of slats forming a screen at the bottom of each component part of the stripping mechanisms to permit loose foreign matter to drop therethrough as the elevators or conveyors carry the stripped matter upwardly.

A further object is the provision of elevators or conveyors for the stripping mechanisms which will convey matter stripped or combed from the stripping rolls upwardly on the lower sides of the elevators or conveyors, thus maintaining the matter in contact with the screen bottoms of each of the component parts of the stripping mechanisms as the matter is conveyed upwardly.

Another object is the provision of elevators or conveyors, the lower ends of which are disposed below the lower ends of the stripping rolls so that cotton picked up by gathering fingers disposed adjacent the extreme tips of the stripping rolls or by the extreme tips of the rolls is conveyed upwardly of each stripping mechanism.

Other and further objects will appear from the following detailed description of a preferred embodiment of my invention illustrated in the accompanying drawing in which:

Figure 1 is a plan view of a cotton harvester mounted on a tractor, the latter being shown in dotted lines, and showing the normal operative position of the stripping mechanisms of my invention;

Figure 2 is a cross sectional view taken along the line 2—2 of Figure 1; and

Figure 3 is a cross sectional view taken along the line 3—3 of Figure 1.

In Figure 1 of the drawing, I have illustrated a harvester of the character above described, mounted on a tractor 4 illustrated in dotted lines. The cotton harvester generally comprises stripping mechanisms 5 mounted forwardly and in advance of the tractor, combined conveyors and preliminary cleaning mechanisms 6 mounted one along each side of the tractor, a final cleaner mechanism 7 positioned rearwardly of the combined conveyor and preliminary cleaning mechanisms 6 at the rear of the tractor and extending transversely thereof, and the rear elevator 8 positioned at the rear of the final cleaner and extending outwardly sidewise of the harvester. Since the particular detail of the final cleaner 7, and the rear elevator 8 form no part of the present invention, they will be only generally referred to hereinafter. These parts have, however, been shown so that the machine illustrating my invention may be complete. It is to be noted that the final cleaner and elevator are of the type disclosed and claimed in the application of Frank T. Court, Serial No. 519,926, filed March 4, 1931, and I do not intend to claim as my invention any of the features claimed in the aforesaid applications.

The stripping mechanisms 5 are pivotally supported at their upper rear ends on a drive shaft 9 journaled in bearings 11 carried by four forwardly extending arms 12 of a frame 13 secured to the front end of the tractor. Each stripping mechanism comprises similar component parts including outer side plates 14, each of which are provided with inwardly extending flanges 15 and 16, the former being at the upper edges thereof with the latter at the lower edges. The upper inner sides of each component part are provided with longitudinally disposed angle iron members 17 supported at their upper ends by a transverse angle member 18 extending across the entire mechanism and suitably secured to the upper flanges 15 of the side plates 14. At their lower ends, the angle iron members 17 are riveted to a rear flange 19 of a tip plate member 21, the latter having an outer straight side while the inner side thereof is flared outwardly. The under side of each tip 21 is provided with a bottom plate or ground engaging shoe 22 having an angularly disposed rear flange 23. Secured to this rear flange 23 is the forward end of a screen 24 comprising a series of slats 25 reinforced by cross members 26. As will be noted in Figure 2, the ends of the cross members 26 extend beyond the outer slats. A bracket 27 having an angularly disposed journal portion 28 is secured on the inner face of the ground engaging shoe 22, with the journal portion thereof extending upwardly and rearwardly thereof. The inner side of each conveyor housing is open except for a longitudinally disposed stripping plate 29 provided at the lower edge of each housing. The tip plate member 21 is cut back at 63 forming an opening at the inner side thereof over the flange 23 and over the stripping plate 29, as illustrated in Figure 3, for a purpose hereinafter explained. The stripping plates 29 are each provided with angularly disposed flanges 31 at their lower edges, their upper edges being provided with spaced notches 32. This upper notched portion is bent outwardly at 33 for a purpose to be hereinafter described. Referring again to Figure 2, it will be noted that the cross members 26 of the screens 24 are each bolted to the flanges 16 of the side plates 14 at one end, and to the flanges 31 of the stripping plates 29 at the other end. From Figure 3 it will be noted that the portion 63 of the member 21 meets the bottom plate or shoe 22 at a point slightly in advance of the point where the upper edge of the stripping plate 29 extends down and meets the plate 22, which is adjacent the axis of the journal portion 28 of the roll bracket 27, as best shown in Figure 3. There is, therefore, an available space between the rear edge 63 and the forward edge of wall 29 which constitutes an opening substantially at the ground level through which loose cotton may pass into the conveyor housings.

A pair of stripping rolls 34 have their forward ends journaled on the journal portions 28 of the brackets 27, and are provided at their rear ends with shafts 35 journaled in a plate 36 secured at its upper end to the angle iron 18 and at its intermediate portion and along its lower edge to a rectangular frame 37, the side portions of which are provided with bearings 38 journaled on the shaft 9. Each stripping roll is provided with outwardly extending peripheral fingers 39, and the fingers on the complementary rolls of each stripping mechanism are so arranged that they overlap and pass each other in staggered relation upon rotation of the rolls. Bevel gears 41 are fixed to the shafts 35 at their ends and mesh with bevel gears 42 fixed on the shaft 9. The shaft 9 is rotated in such a direction as to rotate the rolls 34 so that the fingers 39 thereof will move upwardly relative to the plants passing therebetween. The ends of the fingers 39 are bent or inclined in a direction opposite to the rotational direction of the stripping rolls. The fingers 39 are adapted to pass through the notches 32 of the stripping plates 29 as the stripping rolls are rotated. By reason of the inclination of the fingers 39 of the stripping rolls, as the fingers move down through the notches in the stripping plates and withdraw from such notches, the end portions of the fingers recede from the notches on an efficient stripping angle approximating a right angle, so that the cotton is easily pulled or stripped from the fingers without any tendency to bunch or clog between the under sides of the fingers and the stripping plates. Otherwise some of the cotton might be drawn through the notches and lost. The inclination of the upper notched portions 33 of the stripping plates 29 relative to the stripping rolls aids in this improved stripping action. While I prefer to provide both fingers and stripping plates with inclinations relative to each other, it will be evident that the improved stripping action might be accomplished by the provision of inclination to one or the other.

A series of resilient fingers 43 are provided at the forward end of each component part of the stripping mechanism and are secured at their forward ends to a bracket or base 44 secured to the shoe 22. These fingers 43 extend rearwardly and upwardly and have their rear ends disposed in immediate proximity to the peripheries of the stripping rolls so that they aid in guiding the plants of each row between each set of stripping rolls.

Elevators 45, one for each stripping roll and comprising endless chains 46 having outwardly extending paddles 47 secured thereto, are mounted in each conveyor housing so that the paddles 47 are adapted to move upwardly on the lower sides thereof with the outer edges of the paddles moving along the upper surface of the screen 24. The direction of movement of the elevator is indicated by the arrow in Figure 3. The chains 46 pass over sprockets 48 at the upper ends of the elevators, said sprockets being fixed on the drive shaft 9. The lower ends of the elevators each pass over an idler pulley 49 journaled on a shaft 51 supported by a bracket 52 suitably secured to the tip 21 and to the angle iron 17. The forward ends of the elevators 45 extend beyond the forward ends of the stripping rolls 34.

The forward end of each component part of each stripping mechanism has secured thereto at its outer side, and to the tip 21, a forwardly and upwardly extending angle member 53, which is suitably secured at its forward end to a transverse frame member 54. A pair of caster wheels 55 are suitably mounted at the outer corners of the forward frame comprising the angle members 53 and frame member 54, and are suitably slidably connected thereto, as shown and described in the first mentioned application of Frank T. Court.

A suitable means for maintaining the forward ends of the stripping mechanisms for movement along the ground and to aid such ends in passing over rough or uneven ground such as may be encountered along the rows of plants, or in passing over obstructions, depressions, or ditches in the normal operation of the harvester is shown and described in the first-mentioned application of Frank T. Court, hereinbefore identified, and reference may be had thereto for a more detailed disclosure thereof. A power take-off connection for controlling the effective raising and lowering of the forward ends of the stripping mechanisms on the casters for purposes of elevating and lowering such ends when the harvester is to be transported from one location to another, is likewise more particularly disclosed in said copending application.

The stripping mechanisms are driven by a chain and sprocket connection 57 from one of the combined conveyors and preliminary cleaners 6, having a shaft 58 therein driven from a power take-off connection 59 associated with the power plant of the tractor 4.

In operation, as the harvester is moved along the rows of plants, the plants are guided by the spring fingers 43 between the stripping rolls 34, where the fingers 39 of the stripping rolls strip the bolls from the plants and carry them around over the tops of the rolls, from which they are combed by the stripping plates 29. The bolls are then deposited upon the slats 25 of the screens 24 and are carried upward by the paddles 47 of the elevators 45. Cotton lying on the ground comes in contact with the fingers 43 and is pushed upwardly, sliding along the inclination of the fingers by the lower branches of the plants until it comes in contact with the lower tapering portion of the rolls 34. The rolls 34 then urge it over into the bottom of the conveyor housing, through the opening in the housing adjacent the tip plate 21, formed by the cutting back of the edge 63 thereof, where the paddles 47 direct it into the housing. It will thus be seen that the paddles assist in gathering cotton close to the ground. In addition, the fingers 43 alone are effective to pick up cotton lying on the ground and guide it into the opening between the forward edge of the stripping wall 29 and the rear edge 63 of the tip member 21, even if the stripping rolls 34 were not extended downwardly to a point adjacent the ground as illustrated. The specific details of these features are, however, not a part of the present invention but are a part of the invention disclosed and claimed in the first mentioned application of Frank T. Court, referred to above. As the bolls and other foreign matter picked off therewith are carried upwardly along the screens by the upwardly moving lower run of the elevators 45, free foreign matter is dropped through the screen upon the ground. Cotton and other material which is not discharged through the screens is delivered into the receiving ends of the combined conveyors and preliminary cleaners 6. Insofar as the function of preliminary cleaning and conveying the stripped material, it is to be noted that the elevators 45, in conveying the cotton rearwardly, serve also to clean the same, since by the movement of the material along the screens, sand, dirt and the like are discharged.

By bringing the elevators 45 down so that the forward ends thereof are beyond the ends of the stripping rolls and causing the elevators to carry the picked matter upwardly on their lower sides, such cotton as is picked up by gathering fingers 43 or by the extreme tips of the stripping rolls is carried up, thereby increasing the efficiency of the machine.

Since the paddles 47 of the elevators 45 move around quite rapidly at the discharge ends of the elevators, matter clinging to the paddles may not be deposited in the hoppers of the combined conveyors and preliminary cleaners, but may be thrown upwardly and forwardly of the stripping mechanisms. In order to prevent the loss of such matter as may be thrown forwardly at the discharge ends of the elevators, I have provided each component part of each stripping mechanism with hoods 56 and 56', the former being suitably secured along its side edges to the side plates 14 and the angle irons 17, with the forward end thereof suitably secured to the tip 21, as is clearly illustrated in Figure 3, and the latter extending transversely across the upper ends of the elevators. Thus any material which is thrown against the inner sides of the hoods 56 and 56' will be again deposited upon the screens 24 and carried rearwardly to the hoppers of the combined conveyors and preliminary cleaners 6.

While I have shown a preferred embodiment of my invention, I do not wish to be limited thereto. As will be understood by those skilled in the art, certain changes may be made therein without departing from the spirit and scope of the appended claims.

What I claim and desire to secure by Letters Patent is:

1. In combination, a pair of rotatable means each having cotton engaging means thereon adapted to strip cotton from plants, the engaging means of one rotatable means overlapping the engaging means of the other rotatable means, and stationary means for stripping cotton from said engaging means, said engaging means having portions thereof inclined in a direction opposite to that of rotation of said rotatable means and said stationary means having a portion thereof inclined toward said rotatable means, whereby the coaction between said engaging means and said stationary means permits of free removal of cotton by said stationary means.

2. In combination, a stripping roll having outwardly extending fingers on the periphery thereof adapted to strip matter from plants and including portions bent rearwardly in a direction opposite to the direction of rotation of the stripping roll, and means for stripping said matter from said fingers, said means having slots therein for the passage therethrough of said fingers and so disposed relative to the bent portions of said fingers as to remove said matter axially thereof.

3. In combination, a stripping roll adapted to rotate and having outwardly extending fingers rigidly mounted on the periphery thereof adapted to strip matter from plants, said fingers having the end portions extending in a straight line non-radially with respect to said roll.

4. In combination, a stripping roll adapted to rotate and having outwardly extending fingers rigidly mounted on the periphery thereof adapted to strip matter from plants, said fingers having the end portions extending non-radially with respect to said roll in a direction opposite to the operative rotation of said roll, and stripping means extending adjacent the roll in generally perpendicular relation with respect to the non-radial end portions of said fingers during at least a portion of their rotation.

5. In combination, a stripping roll adapted to rotate, radially extending fingers rigidly mounted on the periphery thereof adapted to strip matter from plants and having non-radially disposed straight portions extending in a direction opposite to that of rotation of said roll, and means adapted to strip said matter from said portions of fingers axially thereof.

6. In combination, elongated stripping means mounted on a roll to rotate therewith and including teeth adapted to strip matter from plants, and means adapted to strip said matter from said elongated stripping means, said stripping means being so disposed relative to said second stripping means as to remove said matter axially of said teeth.

7. In combination, in a stripping mechanism forwardly and downwardly extending stripping means adapted to remove matter from plants, means for removing said matter from said stripping means, and paddle means for conveying said matter, said paddle means extending beyond the lower end of said stripping means and being exposed at said extension beyond the lower end of the stripping means to matter growing in proximity to the ground.

8. In combination in a stripping mechanism, a housing having a means therein adapted to clean matter passed thereover, a stripping roll having peripheral outwardly extending fingers and positioned adjacent one side of said housing, said side having means thereon adapted to remove matter from the fingers of said stripping roll and to direct said matter into said housing, and means in said housing adapted to convey said matter longitudinally of said housing and over said cleaning means thereby effecting cleaning of said matter by the cleaning means simultaneously with conveyance of the matter.

9. In combination in a stripping mechanism, a housing having side walls and a bottom, said bottom comprising a grating, a roll having means thereon for stripping matter from plants and positioned adjacent one side wall of said housing, said last named side wall having means thereon for stripping matter from said roll and for directing said matter to the bottom of said housing, and means in said housing adapted to convey matter deposited on said bottom therealong.

10. In combination in a stripping mechanism adapted to be moved along the ground, a housing having side walls and a bottom, said bottom comprising a grating, a roll having means thereon for stripping matter from plants, said roll being positioned adjacent one side wall of said housing, said roll having one end thereof extending in proximity to the ground, means on said last named side wall adapted to strip said matter from said roll and to direct said matter to said bottom, and an endless elevator in said housing for conveying said matter and having a part thereof extending beyond said end of said roll.

11. In combination, a stripping mechanism comprising component inclined parts each comprising a housing having inner and outer side walls and a bottom, said bottom comprising a grating, a roll adapted to rotate and having outwardly extending fingers thereon having the ends thereof disposed non-radially with respect to said roll in a direction opposite to that of rotation of said roll, said fingers being adapted to strip cotton from plants, said roll being positioned adjacent the inner side wall of said housing and having one end thereof extending in proximity to the ground, means on said wall adapted to strip cotton from said fingers and having the stripping portion thereof inclined toward said roll whereby the cotton is stripped axially from said fingers and directed to said bottom, and an endless elevator in said housing for conveying said cotton upwardly along said bottom and having a part thereof extending beyond the lower end of said roll, the component parts of the mechanism being so positioned with respect to each other that the fingers of the rolls will pass each other in overlapping and staggered relation.

12. In combination, a stripping means adapted to strip matter from plants comprising a rotatable roll having outwardly extending rigidly mounted fingers thereon, each finger having a portion positioned non-radially with respect to the roll in a direction opposite to that of rotation of the roll, and means for removing matter from said fingers, said removing means being inclined toward said roll and positioned non-radially with respect to the roll whereby matter is removed axially along said portions of the fingers upon rotation of the roll.

13. In combination, a rotatable stripping roll having outwardly extending fingers on the periphery thereof for stripping cotton from plants, each finger having a straight portion extending non-radially with respect to the roll, and means for stripping cotton from said fingers comprising a plate contacting with the roll and inclined toward said roll in a non-radial direction relative thereto and having spaced notches therein permitting the fingers to pass therethrough, the cooperation between the plate and cotton carried by the fingers being such that upon the passage of the fingers through said notches the fingers recede from the plate in a path substantially axially of said portions of the fingers, whereby stripping of cotton by the plate from the fingers is accomplished along the lengths of said portions of the fingers.

14. A stripping mechanism comprising a housing terminating in a ground engaging portion and including laterally outer and inner wall sections, there being a space between the upper edge of the inner wall section and the outer wall section to provide a laterally inwardly facing opening, stripping means disposed adjacent said housing and extending therealong adjacent said opening, conveying means disposed within the housing and projecting beyond said stripping means in the direction of said ground engaging portion, and guide means effective upon matter located in proximity to the ground or even lying on the ground to guide such matter toward the lower portion of said opening.

15. In combination, a pair of rotatable stripping rolls, radially extending rigid fingers rigidly mounted on the periphery of each of said rolls and adapted to strip matter from plants, each of said fingers having a straight portion extending in a non-radial direction relative to the roll to which attached and extending in a direction opposite to that of rotation of said roll, journal means for said rolls positioning the rolls so that the fingers of one roll overlap the fingers of the other upon rotation of the rolls, and means contacting with the periphery of each roll and positioned non-radially relatively to the rolls for stripping said matter from said fingers.

16. In combination in a stripping mechanism, a housing having at least one vertical wall, a stripping roll having peripheral outwardly extending fingers and positioned adjacent the vertical wall of said housing, said wall having a generally vertically extending planar portion thereon disposed substantially tangentially with respect to said roll and cooperating with the fingers thereof to remove matter therefrom, and means in said housing to convey said matter longitudinally thereon.

17. In a cotton harvester, stripping mechanism, a housing disposed adjacent thereto and adapted to receive the stripped material, and conveyor mechanism disposed in said housing and comprising an upper and lower run, the lower run being adapted to receive the stripped material and to convey the same upwardly.

18. A cotton stripper comprising a downwardly and forwardly inclined housing adapted to be moved along a plant row, the lower end of said housing being disposed in close proximity to the ground, stripping mechanism associated with said housing and also disposed in a forwardly and downwardly inclined position and adjacent said housing, said mechanism being adapted to discharge stripped material into the lower portion of said housing, and conveying mechanism disposed for operation in said housing and including a lower run disposed adjacent the lower wall of said housing and adapted to convey said stripped material upwardly along the bottom wall of said housing.

19. A cotton stripper comprising a downwardly and forwardly disposed housing, means for moving said housing along a plant row, endless conveyor mechanism disposed in said housing and extending longitudinally thereof, said conveying mechanism including an upper run and a lower run, the latter operating upwardly along the bottom of said housing, and stripping mechanism disposed adjacent said housing and adapted to discharge stripped material into the housing between the upper and lower runs of said conveying mechanism.

20. A cotton stripper comprising, in combination, a downwardly and forwardly disposed housing, conveying mechanism therein and including generally downwardly moving upper portions and upwardly moving lower portions, and stripping mechanism disposed alongside said housing and adapted to discharge stripped material into the housing at points intermediate said upper and lower portions of the conveying mechanism.

21. In combination with a stripping mechanism, a housing having a bottom comprising a grating, a roll having means thereon for stripping matter from plants and positioned adjacent the inner side of the housing, means along the inner side of the housing and adjacent the roll for stripping matter from the roll and for directing said matter to the bottom of the housing, and means in the housing adapted to convey matter deposited on said bottom therealong.

22. In combination in a stripping mechanism, a housing having side walls and a bottom, said bottom comprising a grating, a roll having means thereon for stripping matter from plants and positioned adjacent one side wall of said housing, means disposed along said one side of the housing and adjacent said roll for stripping matter from the roll and for directing the same into said housing, and means disposed in said housing and adapted to convey matter longitudinally thereof.

23. The combination with a cotton harvester, of row-following plant stripping mechanism including a downwardly and forwardly inclined roll provided with plant stripping means, and a plurality of curved resilient arms disposed on opposite sides of said stripping mechanism and extending laterally inwardly and rearwardly for guiding plants toward the plant stripping means on said roll.

24. The combination with a cotton harvester, of row-following plant stripping mechanism including a pair of downwardly and forwardly inclined rolls, each roll being provided with plant stripping means, and a plurality of curved resilient arms disposed on opposite sides of said stripping rolls and extending laterally inwardly and rearwardly for guiding plants between said rolls into engagement with the stripping means carried thereby.

25. A cotton stripper comprising, in combination, a downwardly disposed housing adapted to be moved along a plant row, stripping mechanism comprising a stripping roll having stripping fingers carried thereby, said roll being disposed adjacent said housing and adapted to discharge stripped material picked by said fingers into the housing, and means operating in proximity to the ground surface and disposed below the fingers on said roll for directing loose cotton directly into the housing without coming into contact with the stripping fingers on said roll.

26. A cotton stripper comprising, in combination, a downwardly disposed housing adapted to be moved along a plant row, stripping mechanism comprising a stripping roll carrying stripping fingers and having a generally conical lower end forwardly of said fingers, said roll being disposed adjacent said housing and adapted to discharge stripped material into the housing, and a plurality of guide rods carried by the forward portion of said housing and serving to direct cotton toward the conical end of said roll.

27. A cotton harvesting machine comprising row-following, plant stripping means, and conveying means for receiving cotton directly from said stripping means, said conveying means including means for removing foreign matter from the cotton and disposed alongside said stripping means.

28. In a cotton harvesting machine, row-following, plant stripping means comprising a pair of component members adapted to guide plants therebetween, a downwardly and forwardly inclined stripping means, means cooperating with said stripping means to remove matter from said stripping means, and means adapted to receive matter from said removing means for concurrently conveying and removing foreign matter from said stripped matter, all of said means being carried by one of said component members.

FREDERICK A. THOMANN.